US012400082B2

(12) United States Patent
Kim et al.

(10) Patent No.: US 12,400,082 B2
(45) Date of Patent: Aug. 26, 2025

(54) ELECTRONIC DEVICE FOR PROVIDING VOICE RECOGNITION SERVICE USING USER DATA AND OPERATING METHOD THEREOF

(71) Applicant: Samsung Electronics Co., Ltd., Suwon-si (KR)

(72) Inventors: Juwhan Kim, Suwon-si (KR); Kibeom Kim, Suwon-si (KR); Dasom Kim, Suwon-si (KR); Dongwan Kim, Suwon-si (KR); Sangmin Park, Suwon-si (KR); Hyejung Son, Suwon-si (KR); Yoonju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 18/064,557

(22) Filed: Dec. 12, 2022

(65) Prior Publication Data

US 2023/0186031 A1 Jun. 15, 2023

Related U.S. Application Data

(63) Continuation of application No. PCT/KR2022/020138, filed on Dec. 12, 2022.

(30) Foreign Application Priority Data

Dec. 13, 2021 (KR) .................. 10-2021-0177908
Jan. 11, 2022 (KR) .................. 10-2022-0004102

(51) Int. Cl.
*G06F 40/30* (2020.01)
*G06F 40/253* (2020.01)
*G06F 40/284* (2020.01)

(52) U.S. Cl.
CPC ............ *G06F 40/30* (2020.01); *G06F 40/253* (2020.01); *G06F 40/284* (2020.01)

(58) Field of Classification Search
CPC ...... G06F 40/30; G06F 40/253; G06F 40/284; G06F 40/279; G06F 40/35; G06F 40/274;
(Continued)

(56) References Cited

U.S. PATENT DOCUMENTS 10,223,445 B2 3/2019 Suleman et al.
10,431,221 B2 10/2019 Yoon
(Continued)

FOREIGN PATENT DOCUMENTS

JP 2020-086332 A 6/2020
KR 10-1593739 B1 2/2016
(Continued)

OTHER PUBLICATIONS

Xiaohu Liu et al., Personalized Natural Language Understanding, Jul. 2016.
(Continued)

*Primary Examiner* — Yogeshkumar Patel
(74) *Attorney, Agent, or Firm* — Jefferson IP Law, LLP

(57) ABSTRACT

An electronic device including an input device, a processor, and a memory that stores instructions are provided. The instructions, when executed by the processor, cause the electronic device to obtain a natural language input by using the input device, to convert the natural language input into first input data, to identify data corresponding to at least part of the natural language input in a specified type of data included in the memory, to generate second input data based on the identification result, and to determine at least one task according to the natural language input based on the first input data and the second input data.

18 Claims, 12 Drawing Sheets

(58) Field of Classification Search
CPC ...... G06F 40/289; G06F 40/295; G06F 40/20; G06F 40/56; G06F 40/268; G06F 16/243; G06F 16/33; G06F 16/3343; G06F 16/3344
See application file for complete search history.

(56) References Cited

U.S. PATENT DOCUMENTS

| | | | |
|---|---|---|---|
| 10,706,841 | B2 | 7/2020 | Gruber et al. |
| 11,423,886 | B2 | 8/2022 | Gruber et al. |
| 11,675,983 | B2 | 6/2023 | Liu et al. |
| 2015/0081279 | A1 | 3/2015 | Suleman et al. |
| 2019/0066677 | A1* | 2/2019 | Jaygarl ................ G10L 15/30 |
| 2020/0372088 | A1* | 11/2020 | Liu ..................... G06F 16/9532 |
| 2021/0209167 | A1 | 7/2021 | Feng et al. |
| 2021/0286934 | A1 | 9/2021 | Liu et al. |
| 2021/0286949 | A1 | 9/2021 | Hashimoto et al. |
| 2022/0005466 | A1 | 1/2022 | Nakamura et al. |
| 2022/0028386 | A1 | 1/2022 | Walas et al. |

FOREIGN PATENT DOCUMENTS

| | | |
|---|---|---|
| KR | 10-2018-0135595 A | 12/2018 |
| KR | 10-2019-0125578 A | 11/2019 |
| KR | 10-2019-0128244 A | 11/2019 |
| KR | 10-2018283 B1 | 11/2019 |
| KR | 10-2020-0033009 A | 3/2020 |
| KR | 10-2021-0113488 A | 9/2021 |
| KR | 10-2021-0138266 A | 11/2021 |
| KR | 20210138266 A * | 11/2021 ........... G06F 40/258 |

OTHER PUBLICATIONS

International Search Report issued on Mar. 30, 2023, issued in International Patent Application No. PCT/KR2022/020138.

* cited by examiner

ELECTRONIC DEVICE FOR PROVIDING VOICE RECOGNITION SERVICE USING USER DATA AND OPERATING METHOD THEREOF

CROSS-REFERENCE TO RELATED APPLICATION(S)

This application is a continuation application, claiming priority under § 365(c), of an International application No. PCT/KR2022/020138, filed on Dec. 12, 2022, which is based on and claims the benefit of a Korean patent application number 10-2021-0177908, filed on Dec. 13, 2021, in the Korean Intellectual Property Office, and of a Korean patent application number 10-2022-0004102, filed on Jan. 11, 2022, in the Korean Intellectual Property Office, the disclosure of each of which is incorporated by reference herein in its entirety.

TECHNICAL FIELD

The disclosure relates to an electronic device that provides a voice recognition service using user data, and an operating method thereof.

BACKGROUND ART

Nowadays, as electronic devices, which complexly perform various functions, such as smart phones are developed, the electronic devices capable of recognizing a voice have been released to improve manipulability.

A voice recognition technology may provide a user-friendly conversation service by being applied to a conversational user interface for outputting a response message in response to a voice question entered by a user with everyday language. The conversational user interface may mean an intelligent user interface for operating during a conversation with the user's language.

The above information is presented as background information only to assist with an understanding of the disclosure. No determination has been made, and no assertion is made, as to whether any of the above might be applicable as prior art with regard to the disclosure.

DISCLOSURE

Technical Problem

A user's utterance may be variously interpreted depending on a situation and/or the user's usage pattern. Also, a plurality of users may utter the same utterance with different intent from one another.

Aspects of the disclosure are to address at least the above-mentioned problems and/or disadvantages and to provide at least the advantages described below. Accordingly, an aspect of the disclosure is to provide a method for an electronic device to accurately recognize intent depending on the user's utterance.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes an input device, a processor, and a memory that stores instructions. The instructions, when executed by the processor, cause the electronic device to obtain a natural language input by using the input device, to convert the natural language input into first input data, to identify data corresponding to at least part of the natural language input in a specified type of data included in the memory, to generate second input data based on the identification result, and to determine at least one task according to the natural language input based on the first input data and the second input data.

In accordance with another aspect of the disclosure, an operating method of an electronic device is provided. The operating method includes obtaining a natural language input by using an input device of the electronic device, converting the natural language input into first input data, identifying data corresponding to at least part of the natural language input in a specified type of data included in a memory of the electronic device, generating second input data based on the identification result, and determining at least one task according to the natural language input based on the first input data and the second input data.

Advantageous Effects

According to various embodiments disclosed in the specification, an electronic device may accurately recognize intent according to a user's utterance.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
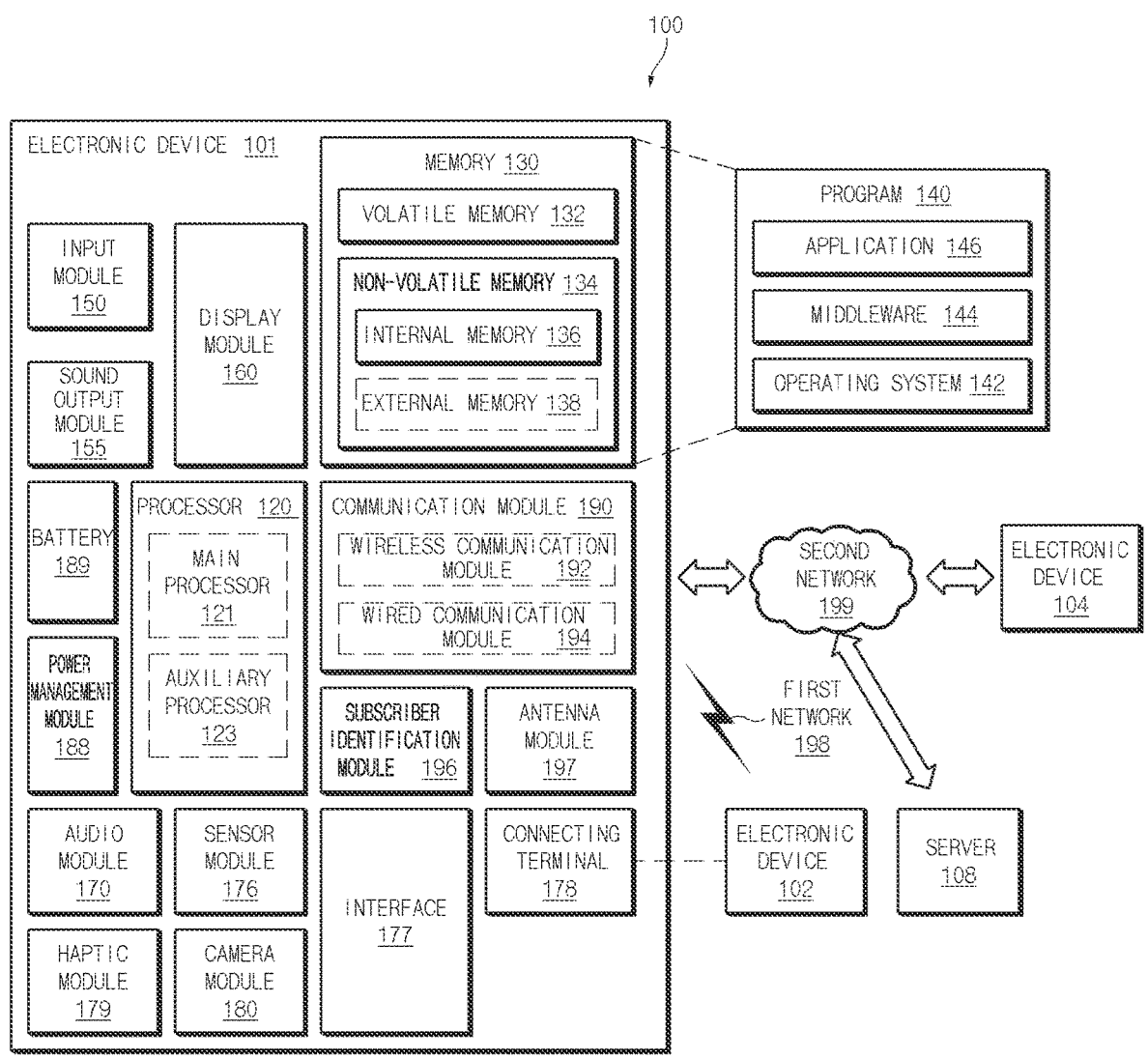
FIG. 1 is a block diagram illustrating an electronic device 101 in a network environment 100 according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
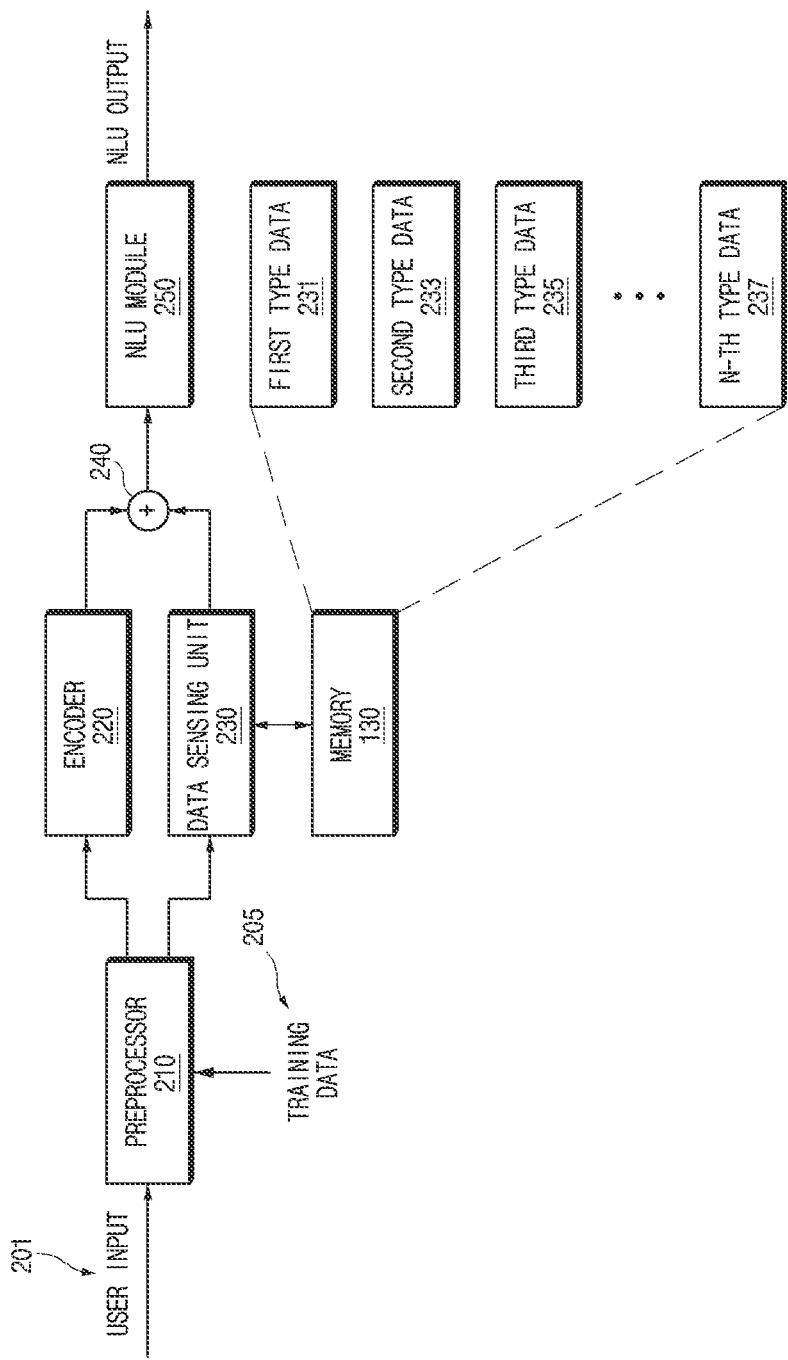
FIG. 2 is a block diagram of an electronic device, according to an embodiment of the disclosure.

FIG. 2 is a block diagram of an electronic device, according to an embodiment of the disclosure.

Figure 3:
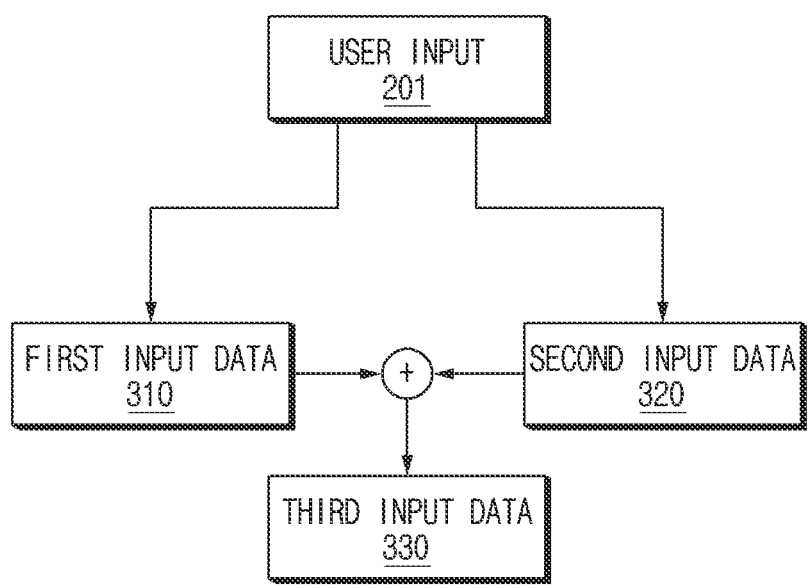
FIG. 3 shows an example of a data flow according to an embodiment of the disclosure.

FIG. 3 shows an example of a data flow according to an embodiment of the disclosure.

Figure 4:
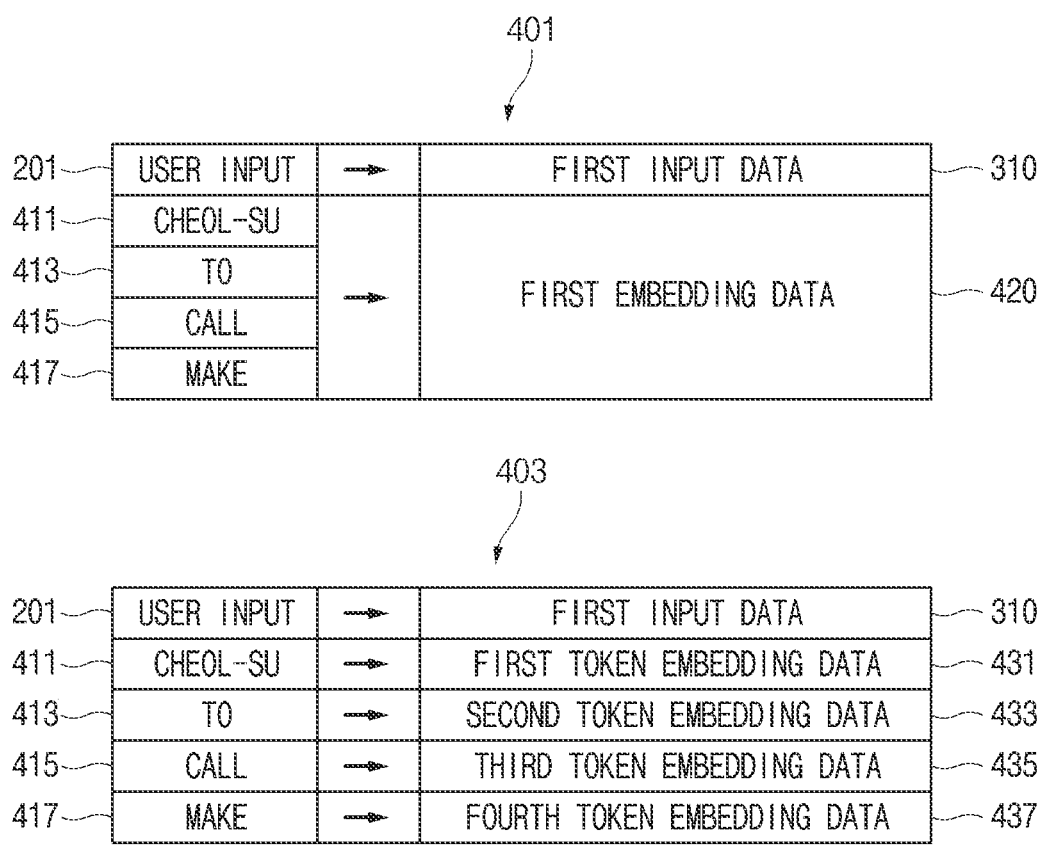
FIG. 4 shows a conversion of a user input into first input data according to an embodiment of the disclosure.

FIG. 4 shows a conversion of a user input into first input data according to an embodiment of the disclosure.

Figure 5:
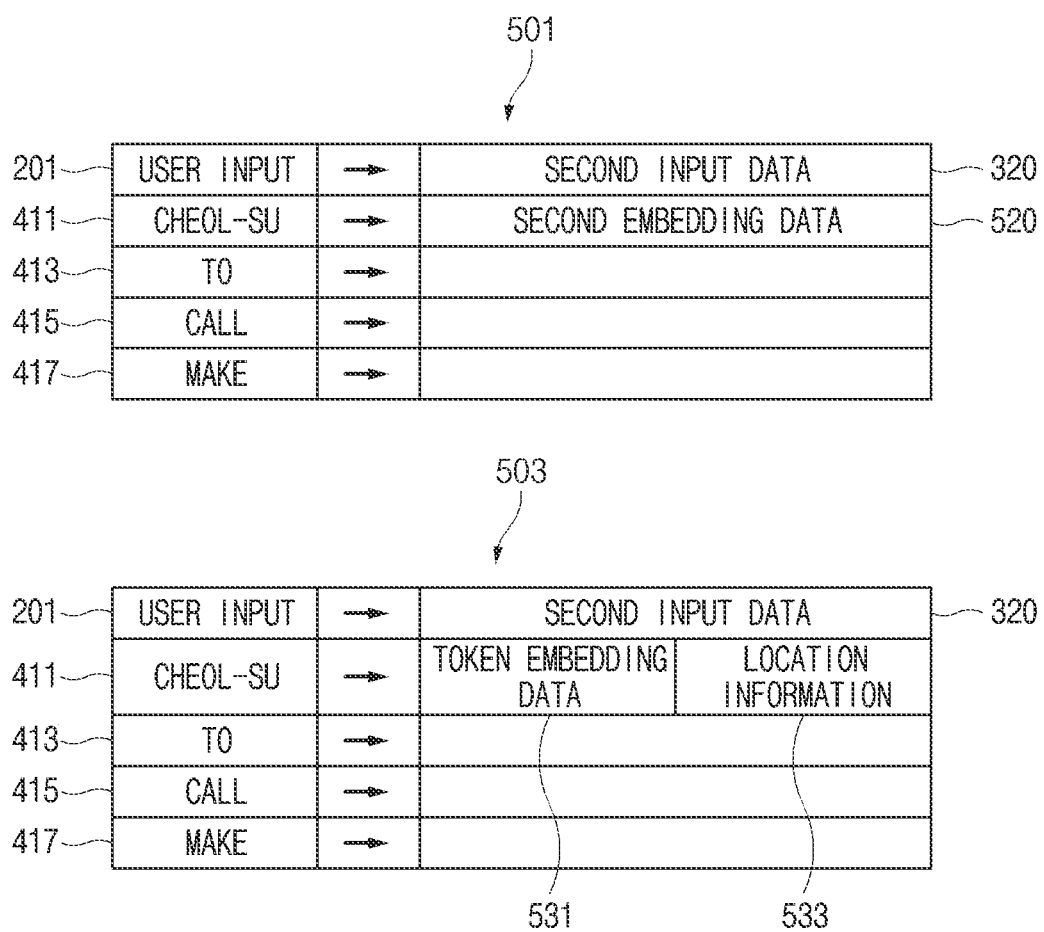
FIG. 5 shows a conversion of a user input into second input data according to an embodiment of the disclosure.

FIG. 5 shows a conversion of the user input into second input data 320 according to an embodiment of the disclosure.

Referring to FIG. 2, the electronic device 101 may include a preprocessor 210, an encoder 220, a data sensing unit 230, a combiner 240, a natural language understanding (NLU) module 250, and a memory 130. In an embodiment, the preprocessor 210, the encoder 220, the data sensing unit 230, the combiner 240, and the NLU module 250 may be the program 140 executable by the processor 120.

The preprocessor 210 may process a user input 201 as data in a form capable of being processed by the encoder 220 and the data sensing unit 230.

In another embodiment, the preprocessor 210 may change the user input 201 into text data. For example, the preprocessor 210 may convert an utterance of "make a call to Cheol-su" according to the user input 201 into text data.

In an embodiment, the preprocessor 210 may split words included in a sentence according to the user input 201 and may input the split words to the encoder 220 and the data sensing unit 230. For example, when the sentence according to the user input 201 is "make a call to Cheol-su", the preprocessor 210 may split the sentence ("make a call to Cheol-su") according to the user input 201 into "Cheol-su" 411, "to" 413, "call" 415, and "make" 417 for each semantic unit. The preprocessor 210 may input "Cheol-su" 411, "to" 413, "call" 415, and "make" 417, which are split for each semantic unit, to the encoder 220 and the data sensing unit 230. Hereinafter, an operation of splitting words included in a sentence may also be referred to as "tokenization".

The encoder 220 may convert the natural language input 201 into a first input data 310.

Referring to FIG. 3, in an embodiment, the encoder 220 may convert the natural language input 201 into the first input data 310 into sentences. For example, the encoder 220 may convert the natural language input 201 into the first input data 310 in units of sentence, based on sentence-unit embedding schemes (e.g., embedding from language models (ELMo), bidirectional encoder representations from transformer (BERT), and generation pre-training (GPT)). Here, the first input data 310 may be data including one vector.

Referring to FIG. 4, in block 401, when the encoder 220 converts the user input 201 including "Cheol-su" 411, "to" 413, "call" 415, and "make" 417 into sentences, first embedding data 420 may be generated. The first embedding data 420 may be a vector value of a specified dimension.

In another embodiment, the encoder 220 may convert the natural language input 201 into the first input data 310 in units of word. For example, the encoder 220 may convert the natural language input 201 into the first input data 310 in units of word based on word-unit embedding schemes (e.g., neural probabilistic language model (NPLM), Word2Vec, and global vectors for word representation (GloVe)). For example, the first input data 310 may be data including a plurality of vectors. Each of the plurality of vectors may be a vector for a corresponding word among a plurality of words included in the sentence according to the natural language input 201.

Referring to block 403, when the encoder 220 converts the user input 201 including Cheol-su 411, to 413, call 415, and make 417 in units of word, pieces of token embedding data 431, 433, 435, and 437 may be generated. Each of the pieces of token embedding data 431, 433, 435, and 437 may be a vector value of a specified dimension.

In an embodiment, the encoder 220 may assign a vector value to each word such that a distance between words having similar meanings decreases. For example, the encoder 220 may assign a vector value to each word such that a distance between vector values of words having similar meanings is within a specified distance. For example, the encoder 220 may assign a vector value to each of "husband" and "bridegroom" such that a distance between vector values of "husband" and "bridegroom" is within the specified distance. As another example, the encoder 220 may assign a vector value to a specific word (e.g., husband) such that a distance between vector values for general nicknames (e.g., darling) is within the specified distance.

The data sensing unit 230 may identify data corresponding to at least part of the natural language input 201 from the memory 130. In an embodiment, the at least part of the natural language input 201 may be a specified word among words included in a sentence according to the natural language input 201. In an embodiment, the specified word may include a specified type of a word and/or a word at a specified location among words included in the sentence according to the natural language input 201. For example, in the case of the sentence ("make a call to Cheol-su") according to the user input 201, the specified word may be a word (e.g., "Cheol-su") indicating a name. As another example, in the case of the sentence ("make a call to Cheol-su") according to the user input 201, the specified word may be a word (e.g., "Cheol-su") at a location indicating a target of a verb.

The data sensing unit 230 may determine whether a specified word of the natural language input 201 is present in a specified type (or kind) of data 231, 233, 235, and 237 in the memory 130. In an embodiment, the specified type (or kind) of the data 231, 233, 235, and 237 may include data generated by a user. In an embodiment, the specified type (or kind) of the data may be data regarding a contact, a file name, an application name, a shortcut name, or a combination thereof. For example, the data sensing unit 230 may search for "Cheol-su", which is a specified word, in the contact. For example, the data sensing unit 230 may search for a file having a file name including "Cheol-su", which is a specified word, from among files. For example, the data sensing unit 230 may search for an application having an application name including "Cheol-su", which is a specified word, from among applications.

The data sensing unit 230 may determine whether the specified word is found from two or more types of data. In an embodiment, when the specified word is found in two or more types of data, the data sensing unit 230 may select only one of the two or more types. For example, when a contact and a file name, each of which includes the specified word of "Cheol-su", are found, the data sensing unit 230 may select only one type (e.g., contact) among a contact and a file name.

In an embodiment, when the specified word is found in the two or more types of data, the data sensing unit 230 may determine one type among two or more types based on the priority of each of two or more types. In an embodiment, a priority may be determined differently depending on the natural language input 201. In an embodiment, the priority may be determined differently depending on words included in the natural language input 201. In an embodiment, the priority may be determined differently depending on a verb included in the natural language input 201. For example, when the verb included in the natural language input 201 is 'call', the priority of the contact may be higher than the priority of the file name or the priority of the application name. As another example, when the verb included in the natural language input 201 is 'execute', the priority of the contact may be lower than the priority of the file name or the priority of the application name.

In an embodiment, when the specified word is found in the two or more types of data, the data sensing unit 230 may output a user interface for requesting selection of one of the two or more types. The data sensing unit 230 may determine one of the two or more types based on an input for selecting one type obtained after outputting the user interface.

In an embodiment, when the specified word is found in two or more types of data, the data sensing unit 230 may determine that the type previously selected by the user among two or more types is the one type.

The data sensing unit 230 may identify a word within a specified similarity range from a specified word among words included in the sentence according to the natural language input 201. The data sensing unit 230 may determine whether a word within a similarity range is present in a specified type (or kind) of data in the memory 130. In an embodiment, when the specified word is not present in the specified type (or kind) of data in the memory 130, the data sensing unit 230 may identify a word within a similarity range and may search for a word within a similarity range in the memory 130.

In an embodiment, the word within the specified similarity range of the specified word may be identified based on data provided in advance. The data provided in advance may be data defining similarity and/or dissimilarity between words.

In an embodiment, the word within a specified similarity range of the specified word may be identified based on a distance between vector values respectively assigned to words. For example, when the distance between the vector values of two words is within the specified distance, two words may be identified as being words within a similarity range.

In an embodiment, the word within a specified similarity range of a specified word may be identified based on a fuzzy matching algorithm or a phonemic similarity.

The data sensing unit 230 may generate the second input data 320 based on the identification result. The data sensing unit 230 may generate the second input data 320 by using the identification result that is based on the specified word. The data sensing unit 230 may generate the second input data 320 by using the identification result that is based on a word within a specified semantic similarity range.

In an embodiment, the second input data 320 may indicate whether a specified word of the natural language input 201 is present in a specified type (or kind) of data in the memory 130. For example, when the specified word of the natural language input 201 is present in the specified type (or kind) of data in the memory 130, the second input data 320 may be '1'. As another example, when the specified word of the natural language input 201 is present in the specified type (or kind) of data in the memory 130, the second input data 320 may be '0'.

In an embodiment, the second input data 320 may indicate a type in which a specified word is identified from among a contact, a file name, an application name, a shortcut name, or a combination thereof. In an embodiment, the second input data 320 may indicate whether a specified word of the natural language input 201 is present in each of a contact, a file name, and an application name. The second input data 320 may be data in a vector format for indicating whether the specified word of the natural language input 201 is present in each of contact, file name, and application name. For example, when the specified word is present in only the contact, the second input data 320 may be "<1, 0, 0>". As another example, when the specified word is present in only the contact and the application name, the second input data 320 may be "<1, 0, 1>".

For example, when the user input 201 is converted into sentences, referring to table 501 of FIG. 5, the second input data 320 may include second embedding data 520 indicating whether Cheol-su 411 is present.

In an embodiment, the second input data 320 may include data regarding a location of the specified word in the sentence according to the natural language input 201. For example, the second input data 320 may include data for indicating a first location that is a location of the specified word of "Cheol-su" among "Cheol-su", "to", "call", and "make", which are obtained by splitting a sentence for each semantic unit.

For example, when the user input 201 is converted into words, referring to table 503 of FIG. 5, the second input data 320 may include token embedding data 531 indicating whether Cheol-su 411 is present, and location information 533 of Cheol-su 411.

The combiner 240 may combine the first input data 310 and the second input data 320. The combiner 240 may generate third input data 330 by combining the first input data 310 and the second input data 320.

In an embodiment, the combiner 240 may combine the first input data 310 and the second input data 320 by adding the first input data 310 and the second input data 320. In an embodiment, the combiner 240 may combine the first input data 310 and the second input data 320 by concatenating the second input data 320 at a specified location of the first input data 310. The specified location may be a front end or a rear end of the first input data 310. For example, when the first input data 310 is "11110000" and the second input data 320 is "1", the combiner 240 may generate the third input data 330 of "111110000". As another example, when the first input data 310 is "11110000" and the second input data 320 is "1", the combiner 240 may generate the third input data 330 of "111100001".

In an embodiment, when the encoder 220 converts the user input 201 into sentences, the combiner 240 may combine the first input data 310 and the second input data 320 by combining (or concatenating) the first embedding data 420 and the second embedding data 520. In an embodiment, when the encoder 220 converts the user input 201 into words, the combiner 240 may combine the first input data 310 and the second input data 320 by combining (or concatenating) the first token embedding data 431 and the token embedding data 530 among the pieces of token embedding data 431, 433, 435, and 437.

The NLU module 250 may determine at least one task according to the natural language input 201 based on the third input data 330. The NLU module 250 may determine a user's intent, a domain, an operation performed in the domain, or a combination thereof based on the third input data 330. The NLU module 250 may determine a parameter necessary to perform the determined operation or a result value output by the execution of the operation. The NLU module 250 may generate text-type data indicating a result value. The text-type data may be in a form of a natural language utterance. The NLU module 250 may provide the text-type data (e.g., an NLU output) to a user.

In an embodiment, the NLU module 250 may differently determine a user's intent for the same user input, a domain, an operation performed in the domain, or a combination thereof depending on the second input data 320. For example, when the second input data 320 indicates that "<target>" is found in the first type data 231 (e.g., a contact) in response to a user input of "connect to <target>", on the basis of the first type data 231 (e.g., a contact), the NLU module 250 may identify that the user's intent is a phone connection, may identify that a domain is a phone application, and may identify that an operation performed in the domain is a call connection to "<target>". As another example, when the second input data 320 indicates that "<target>" is found in the second type data 233 (e.g., an IoT device list) in response to a user input of "connect to <target>", on the basis of the second type data 233 (e.g., an IoT device list), the NLU module 250 may identify that the user's intent is a device connection, may identify that a domain is a device control application, and may identify that an operation performed in the domain corresponds to establishing a communication connection to "<target>".

Hereinafter, data generation for the training of the encoder 220 and/or the NLU module 250 and the training method based on the generated training data will be described.

The encoder 220, and/or the NLU module 250 may be trained based on training data 205. For example, the encoder 220 may be trained based on the training data 205 such that a value, which is obtained as the encoder 220 embeds an arbitrary word (or sentence), is changed by the training. For example, the NLU module 250 may be trained based on the training data 205 such that a task according to the third input data 330 of the training data 205 is changed by the training.

The training data 205 may be a plurality of sentences in each of which a specified type of a word and/or a word at a specified location in a specified sentence is changed. For example, in "call <contact name>", "<contact name>" is replaced with a word randomly generated, and thus a plurality of sentences may be generated. For example, "<contact name>" may be replaced with words generated based on similar word composition, common nouns, random string generation, or a combination thereof, and thus a plurality of sentences may be generated.

While the encoder 220 and/or the NLU module 250 is trained based on the training data 205, the data sensing unit 230 may randomly generate the second input data 320 for the training data 205. In an embodiment, the data sensing unit 230 may randomly generate the second input data 320 for the training data 205 at a specified ratio. For example, the data sensing unit 230 may randomly generate, at a specified ratio, the second input data 320 indicating that the specified word of the training data 205 is present in the memory 130, and the second input data 320 indicating that the specified word of the training data 205 is not present in the memory 130.

While the encoder 220 and/or the NLU module 250 is trained based on the training data 205, the data sensing unit 230 may generate the second input data 320 indicating that a specified word is present in data of a specified number among a contact, a file name, and an application name. In an embodiment, the data sensing unit 230 may generate the second input data 320 according to the training data 205, based on the priority of a type trained by the training data 205. For example, when the training data 205 is used to train a first type having a high priority, the data sensing unit 230 may generate the second input data 320 indicating that a specified word is present in data of a first type, and at least a piece of data of a second type having a lower priority than the first type. As another example, when the training data 205 is used to train a third type having a low priority, the data sensing unit 230 may generate the second input data 320 indicating that the specified word is present in only the third type of data.

For example, when the training data 205 is "execute <name>" and a priority of a shortcut name is higher than a priority of a name of an application, while training the shortcut name, the data sensing unit 230 may generate the second input data 320 indicating that the specified word is present in data having the shortcut name and data having the name of the application having a lower priority than the shortcut name. For example, when the training data 205 is "execute <name>" and a priority of a shortcut name is higher than a name of an application, while training the name of the application, the data sensing unit 230 may generate the second input data 320 indicating that the specified word is present in only the data having the name of the application.

Figure 6:
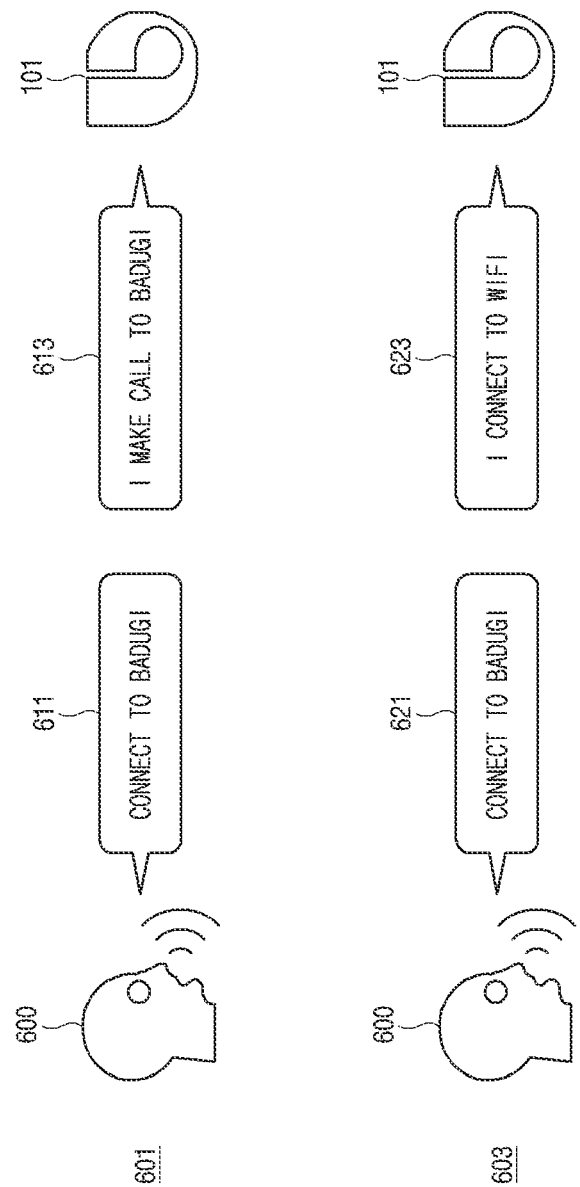
FIG. 6 illustrates a voice recognition service providing situation, according to an embodiment of the disclosure.

FIG. 6 illustrates a voice recognition service providing situation, according to an embodiment of the disclosure.

Referring to FIG. 6, in a situation 601, when a user 600 utters a natural language input 611 of "connect to Badugi", the electronic device 101 may search for "Badugi" from a specified type of data in the memory 130. In a situation where "Badugi" is present in a contact, the electronic device 101 may identify that a domain according to the natural language input 611 is a phone application, and may identify intent according to the natural language input 611 is "making a call". The electronic device 101 may provide a user with a task execution result 613 of "I make a call to Badugi".

In a situation 603, when a user 600 utters a natural language input 621 of "connect to Badugi", the electronic device 101 may search for "Badugi" from a specified type of data in the memory 130. In a situation where "Badugi" is present in a name of the registered WiFi network, the electronic device 101 may identify that a domain according to the natural language input 621 is a device setting application, and may identify that intent according to the natural language input 621 as a WiFi connection. The electronic device 101 may provide the user with a task execution result 623 of "I connect to WiFi".

Figure 7:
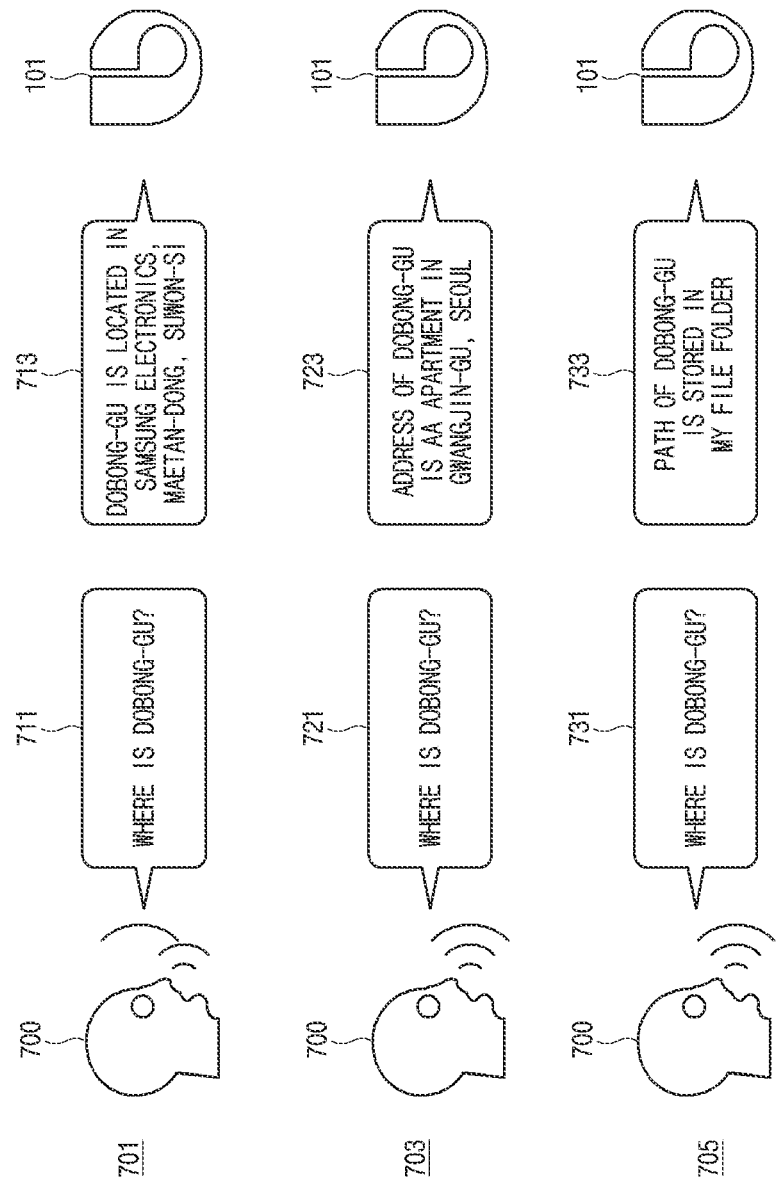
FIG. 7 illustrates a voice recognition service providing situation, according to an embodiment of the disclosure.

FIG. 7 illustrates a voice recognition service providing situation, according to an embodiment of the disclosure.

Referring to FIG. 7, in a situation 701, when a user 700 utters a natural language input 711 of "where is Dobong-gu", the electronic device 101 may search for "Dobong-gu" from a specified type of data in the memory 130. In a situation where "Dobong-gu" is present in names of registered external electronic devices, the electronic device 101 may identify that a domain according to the natural language input 711 is an IoT application, and may identify intent according to the natural language input 711 corresponds to a location search of an external electronic device. The electronic device 101 may provide the user with a task execution result 713 of "Dobong-gu is located in Samsung Electronics, Maetan-dong, Suwon-si".

In a situation 703, when the user 700 utters a natural language input 721 of "where is Dobong-gu", the electronic device 101 may search for "Dobong-gu" from data of a specified kind in the memory 130. In a situation where "Dobong-gu" is present in a contact, the electronic device 101 may identify that a domain according to the natural language input 721 is a contact application, and may identify intent according to the natural language input 721 is "viewing contact information". The electronic device 101 may provide the user with a task execution result 723, "an address of Dobong-gu is AA apartment in Gwangjin-gu, Seoul".

In a situation 705, when the user 700 utters a natural language input 731 of "where is Dobong-gu", the electronic device 101 may search for "Dobong-gu" from a specified type of data in the memory 130. In a situation where "Dobong-gu" is present in file names of files being stored in the electronic device 101, the electronic device 101 may identify that a domain according to the natural language input 731 is a file browser application, and may identify that intent according to the natural language input 731 is a file search. The electronic device 101 may provide the user with a task execution result 733 of "a path of Dobong-gu is stored in my file folder".

Figure 8:
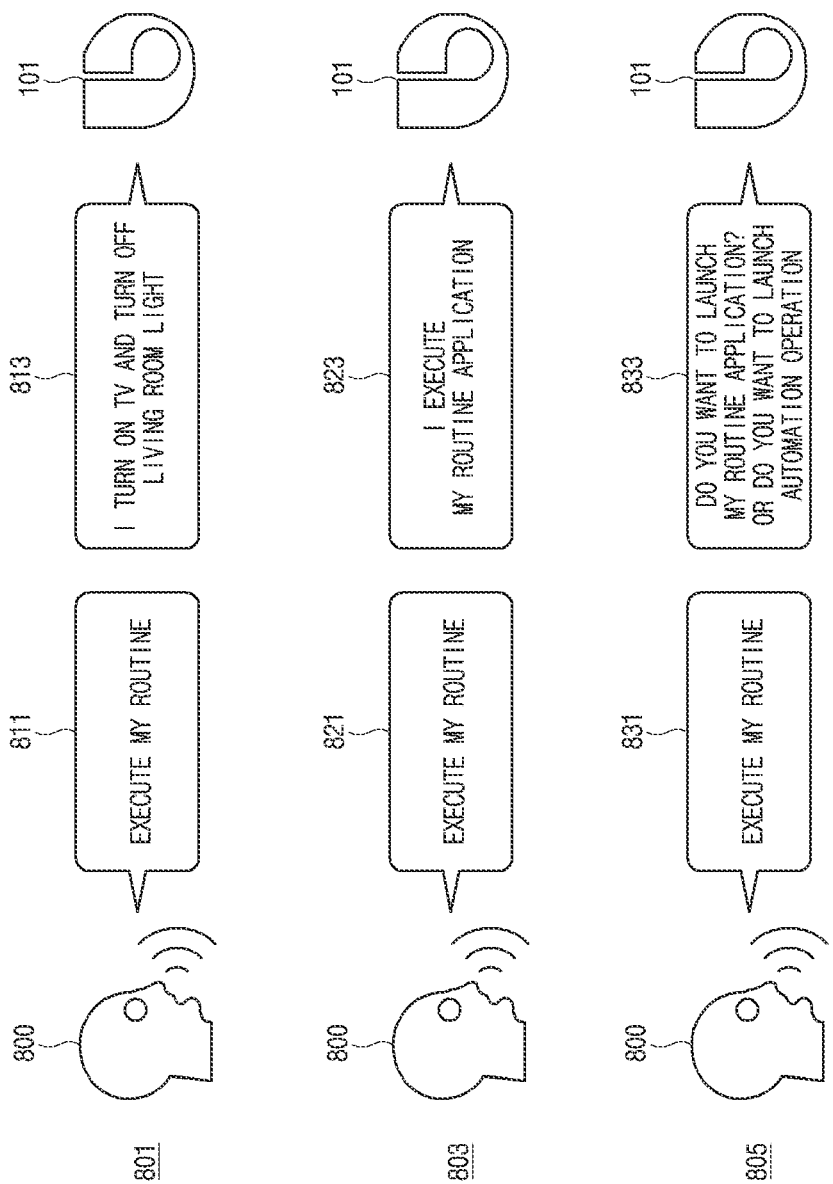
FIG. 8 illustrates a voice recognition service providing situation, according to an embodiment of the disclosure.

FIG. 8 illustrates a voice recognition service providing situation, according to an embodiment of the disclosure.

Referring to FIG. 8, in a situation 801, when a user 800 utters a natural language input 811 of "execute my routine", the electronic device 101 may search for "my routine" from a specified type of data in the memory 130. In the situation where "my Routine" is present in names of registered automation routines, the electronic device 101 may identify that a domain according to the natural language input 811 is an IoT application (e.g., "Smarthings"), and may identify intent according to the natural language input 811 is a routine execution (e.g., television (TV) On, Smart Bulb Off). The electronic device 101 may provide the user with a task execution result 813 of "I turn on a TV and turn off a living room light".

In a situation 803, when the user 800 utters a natural language input 821 of "execute my routine", the electronic device 101 may search for "my routine" from a specified type of data in the memory 130. In a situation where "my routine" is present in an application name, the electronic device 101 may identify that a domain according to the natural language input 821 is my routine application, and may identify intent according to the natural language input 821 is app execution. The electronic device 101 may provide the user with a task execution result 823 of "I execute my routine application".

In a situation 805, when the user 800 utters a natural language input 831 of "execute my routine", the electronic device 101 may search for "my routine" from a specified type of data in the memory 130. In the situation where "my routine" is present in the registered automation routine name and application name, the electronic device 101 may provide the user with a query 833 of "do you want to launch my routine application? Or, do you want to launch an automation operation?" for requesting a selection from an automation routine or an application.

In another embodiment, in a situation where "my routine" is present in the registered automation routine name and application name, the electronic device 101 may provide the user with a task execution result of I turn on a TV and turn off a living room light" depending on the priority of the automation routine or the application. In still another embodiment, in a situation where "my routine" is present in the registered automation routine name and application name, the electronic device 101 may provide the user with the task execution result indicating that the electronic device 101 "executed my routine application", depending on the priority of the automation routine or the application.

In an embodiment, in a situation where "my routine" is present in the registered automation routine name and application name, the electronic device 101 may provide the user with the task execution result of "the electronic device 101 turned on the TV and turned off the living room light" depending on the user's previous selection among an automation routine or an application.

Figure 9:
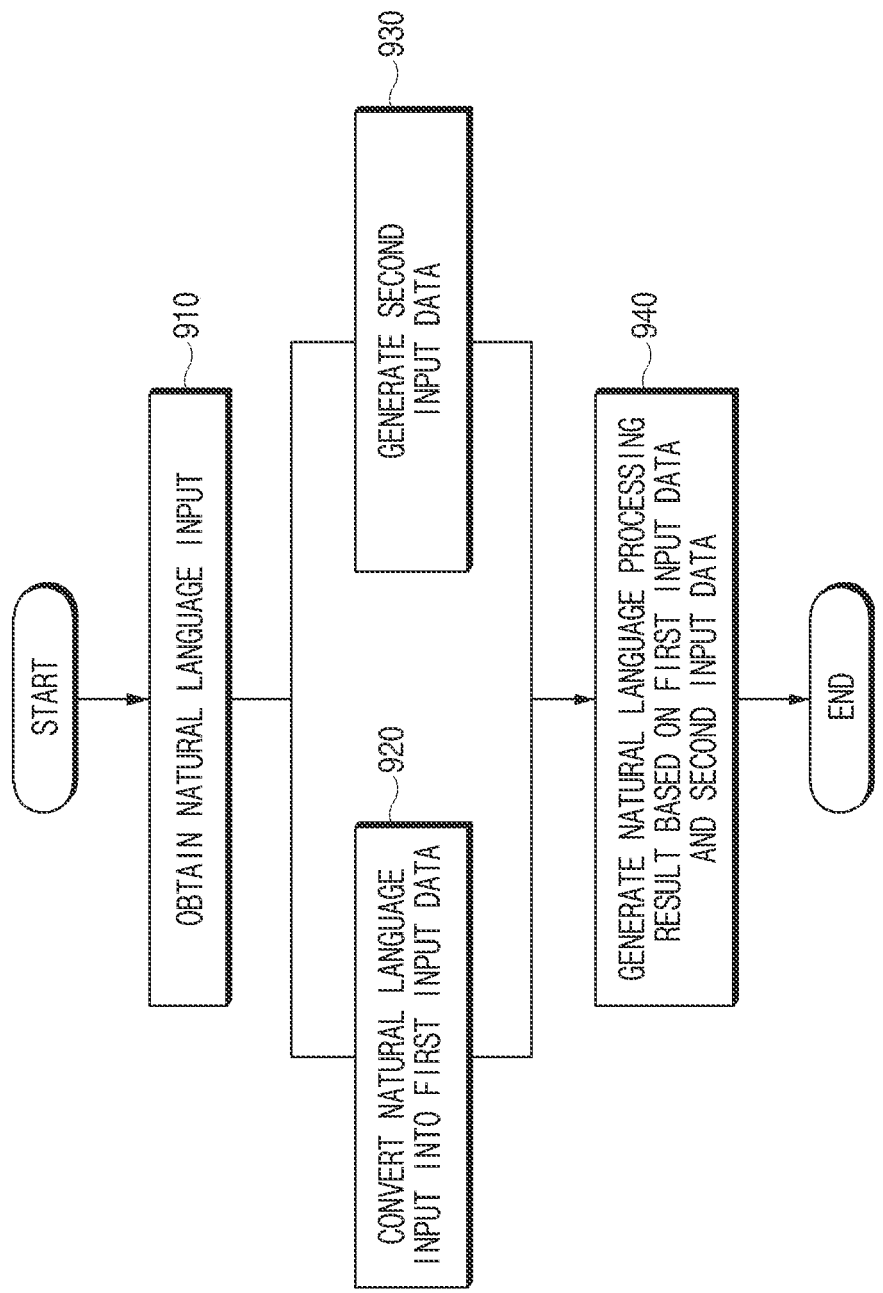
FIG. 9 is a flowchart illustrating a method of operating an electronic device, according to an embodiment of the disclosure.

FIG. 9 is a flowchart illustrating a method of operating an electronic device, according to an embodiment of the disclosure.

Referring to FIG. 9, in operation 910, the electronic device 101 may obtain the natural language input 201. In an embodiment, the electronic device 101 may obtain the natural language input 201 based on the input module 150.

In operation 920, the electronic device 101 may convert the natural language input 201 into the first input data 310. In another embodiment, the electronic device 101 may convert the natural language input 201 into the first input data 310 into sentences. In an embodiment, the electronic device 101 may convert the natural language input 201 into the first input data 310 in units of word. The first input data 310 may be data including at least one vector.

In operation 930, the electronic device 101 may generate the second input data 320 based on the natural language input 201.

In an embodiment, the electronic device 101 may determine whether a specified word of the natural language input 201 is present in a specified type (or kind) of the data 231, 233, 235, and 237 in the memory 130. In an embodiment, the specified word may include a specified type of a word and/or a word at a specified location among words included in the sentence according to the natural language input 201. In an embodiment, the specified type (or kind) of the data 231, 233, 235, and 237 may include data generated by a user. In an embodiment, the specified type (or kind) of the data may be data regarding a contact, a file name, an application name, a shortcut name, or a combination thereof.

When the specified word is found from two or more types of data, the electronic device 101 may determine one of two or more types. In an embodiment, the electronic device 101 may determine one of two or more types based on the user interface for requesting selecting one of the two or more types based on priorities of the two or more types. In an embodiment, the electronic device 101 may determine one of two or more types based on the user interface for requesting selecting one of the two or more types. In an embodiment, the electronic device 101 may determine one of two or more types based on the type previously selected by the user.

In an embodiment, the electronic device 101 may generate the second input data 320 based on the identification result. In an embodiment, the second input data 320 may indicate whether a specified word of the natural language input 201 is present in a specified type (or kind) of data in the memory 130. In an embodiment, the second input data 320 may indicate a type in which a specified word is identified from among a contact, a file name, an application name, a shortcut name, or a combination thereof.

In operation 940, the electronic device 101 may generate a natural language processing result based on the first input data 310 and the second input data 320. In an embodiment, the electronic device 101 may determine a user's intent, a domain, an operation performed in the domain, or a combination thereof. The electronic device 101 may determine a parameter necessary to perform the determined operation or a result value output by the execution of the operation. The electronic device 101 may generate text-type data indicating a result value. The text-type data may be in a form of a natural language utterance. The electronic device 101 may provide text-type data to the user.

In an embodiment, the electronic device 101 may differently determine a user's intent for the same user input, a domain, an operation performed in the domain, or a combination thereof depending on the second input data 320.

Hereinafter, an example in which a function of the electronic device 101 described with reference to FIGS. 2 to 9 is implemented by a server will be described with reference to FIGS. 10 to 12. At least part of the preprocessor 210, the encoder 220, the data sensing unit 230, the combiner 240, the NLU module 250, or the memory 130 of the electronic device 101 may be included in the intelligent server 1100 of FIG. 10. For example, the preprocessor 210, the encoder 220, the data sensing unit 230, the combiner 240, the NLU module 250, and the memory 130 of the electronic device 101 may be included in the intelligent server 1100 of FIG. 10. The electronic device 101 may provide the user input 201 to the intelligent server 1100 and may be implemented in a method of obtaining (or receiving) an NLU output from the intelligent server 1100.

Figure 10:
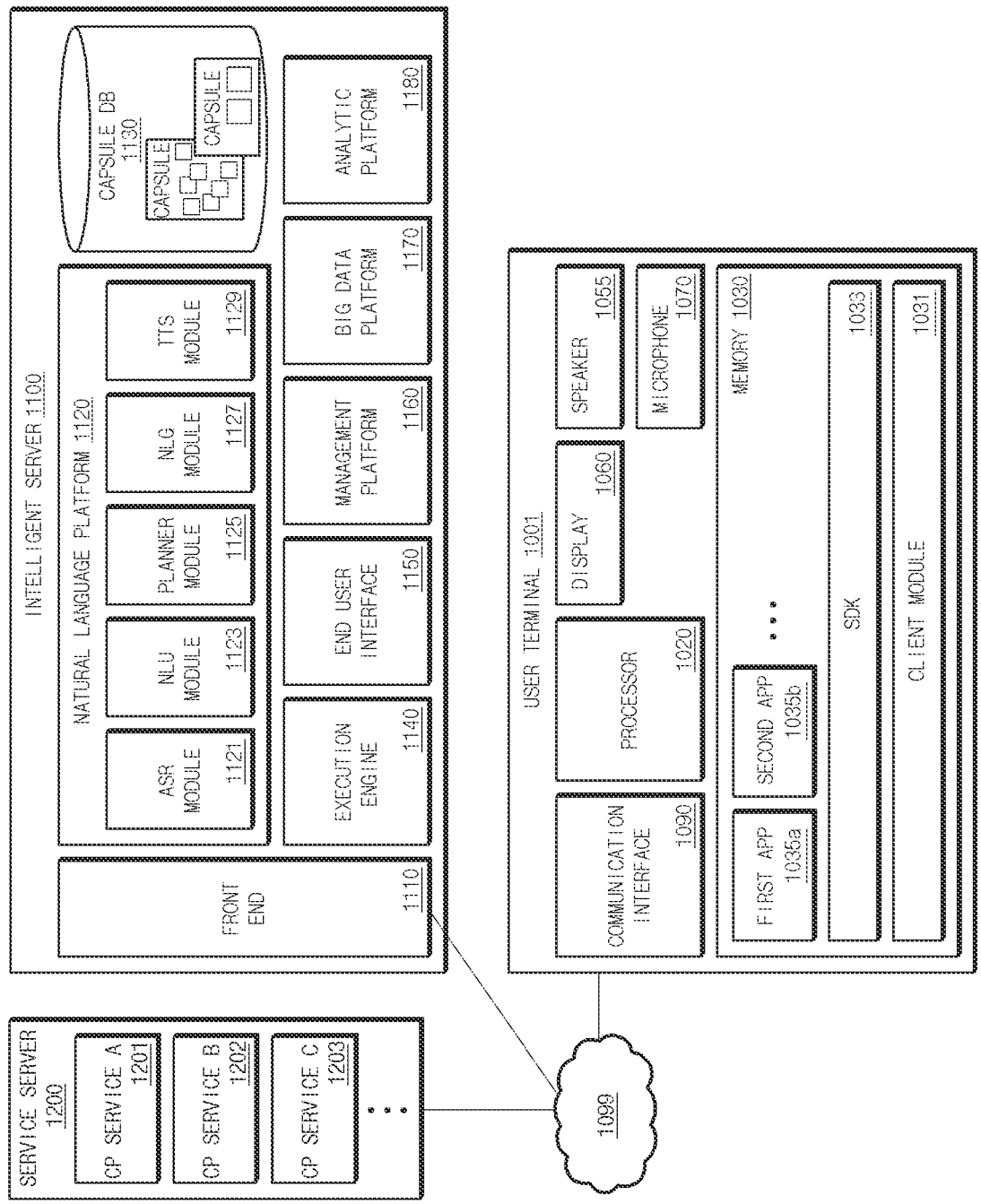
FIG. 10 is a block diagram illustrating an integrated intelligence system, according to an embodiment of the disclosure.

FIG. 10 is a block diagram illustrating an integrated intelligence system, according to an embodiment of the disclosure.

Referring to FIG. 10, an integrated intelligence system according to an embodiment may include a user terminal 1001, an intelligence server 1100, and a service server 1200.

The user terminal 1001 according to an embodiment may be a terminal device (or an electronic device) capable of connecting to Internet, and may be, for example, a mobile phone, a smartphone, a personal digital assistant (PDA), a notebook computer, a television (TV), a household appliance, a wearable device, a head mounted display (HMD), or a smart speaker.

According to the illustrated embodiment, the user terminal 1001 may include a communication interface 1090, a microphone 1070, a speaker 1055, a display 1060, a memory 1030, or a processor 1020. The listed components may be operatively or electrically connected to one another.

The communication interface 1090 according to another embodiment may be connected to an external device and may be configured to transmit or receive data to or from the external device. The microphone 1070 according to an embodiment may receive a sound (e.g., a user utterance) to convert the sound into an electrical signal. The speaker 1055 according to an embodiment may output the electrical signal as sound (e.g., voice). The display 1060 according to an embodiment may be configured to display an image or a video. The display 1060 according to an embodiment may display the graphic user interface (GUI) of the running app (or an application program).

The memory 1030 according to an embodiment may store a client module 1031, a software development kit (SDK) 1033, and a plurality of apps 1135. The client module 1031 and the SDK 1033 may constitute a framework (or a solution program) for performing general-purposed functions. Furthermore, the client module 1031 or the SDK 1033 may constitute the framework for processing a voice input.

The plurality of apps 1035*a*, 1035*b*, . . . , may be programs for performing a specified function. According to an embodiment, the plurality of apps 1035*a*, 1035*b*, . . . , may include a first app 1035*a* and/or a second app 1035*b*. According to an embodiment, each of the plurality of apps 1035a, 1035b, . . . , may include a plurality of actions for performing a specified function. For example, the apps may include an alarm app, a message app, and/or a schedule app. According to an embodiment, the plurality of apps 1035a, 1035b, . . . , may be executed by the processor 1020 to sequentially execute at least part of the plurality of actions.

According to an embodiment, the processor 1020 may control overall operations of the user terminal 1001. For example, the processor 1020 may be electrically connected to the communication interface 1090, the microphone 1070, the speaker 1055, and the display 1060 to perform a specified operation. For example, the processor 1020 may include at least one processor.

Moreover, the processor 1020 according to an embodiment may execute the program stored in the memory 1030 so as to perform a specified function. For example, according to an embodiment, the processor 1020 may execute at least one of the client module 1031 or the SDK 1033 so as to perform a following operation for processing a voice input. The processor 1020 may control operations of the plurality of apps 1035a, 1035b, . . . , via the SDK 1033. The following actions described as the actions of the client module 1031 or the SDK 1033 may be the actions performed by the execution of the processor 1020.

According to an embodiment, the client module 1031 may receive a voice input. For example, the client module 1031 may receive a voice signal corresponding to a user utterance detected through the microphone 1070. The client module 1031 may transmit the received voice input (e.g., a voice input) to the intelligence server 1100. The client module 1031 may transmit state information of the user terminal 1001 to the intelligence server 1100 together with the received voice input. For example, the state information may be execution state information of an app.

According to an embodiment, the client module 1031 may receive a result corresponding to the received voice input. For example, when the intelligence server 1100 is capable of calculating the result corresponding to the received voice input, the client module 1031 may receive the result corresponding to the received voice input. The client module 1031 may display the received result on the display 1060.

According to an embodiment, the client module 1031 may receive a plan corresponding to the received voice input. The client module 1031 may display, on the display 1060, a result of executing a plurality of actions of an app depending on the plan. For example, the client module 1031 may sequentially display the result of executing the plurality of actions on a display. For another example, the user terminal 1001 may display only a part of results (e.g., a result of the last action) of executing the plurality of actions, on the display.

According to an embodiment, the client module 1031 may receive a request for obtaining information necessary to calculate the result corresponding to a voice input, from the intelligence server 1100. According to an embodiment, the client module 1031 may transmit the necessary information to the intelligence server 1100 in response to the request.

According to an embodiment, the client module 1031 may transmit, to the intelligence server 1100, information about the result of executing a plurality of actions depending on the plan. The intelligence server 1100 may identify that the received voice input is correctly processed, using the result information.

According to an embodiment, the client module 1031 may include a speech recognition module. According to an embodiment, the client module 1031 may recognize a voice input for performing a limited function, via the speech recognition module. For example, the client module 1031 may launch an intelligence app for processing a specific voice input by performing an organic action, in response to a specified voice input (e.g., wake up!).

According to an embodiment, the intelligence server 1100 may receive information associated with a user's voice input from the user terminal 1001 over a communication network 1099. According to an embodiment, the intelligence server 1100 may convert data associated with the received voice input to text data. According to an embodiment, the intelligence server 1100 may generate at least one plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system. According to an embodiment, the plan may be selected from a set of predefined plans or may be generated in real time in response to a user's request. For example, the AI system may select at least one plan of the plurality of predefined plans.

According to an embodiment, the intelligence server 1100 may transmit a result according to the generated plan to the user terminal 1001 or may transmit the generated plan to the user terminal 1001. According to an embodiment, the user terminal 1001 may display the result according to the plan, on a display. According to an embodiment, the user terminal 1001 may display a result of executing the action according to the plan, on the display.

The intelligence server 1100 according to an embodiment may include a front end 1110, a natural language platform 1120, a capsule database 1130, an execution engine 1140, an end user interface 1150, a management platform 1160, a big data platform 1170, or an analytic platform 1180.

According to an embodiment, the front end 1110 may receive a voice input received from the user terminal 1001. The front end 1110 may transmit a response corresponding to the voice input to the user terminal 1001.

According to an embodiment, the natural language platform 1120 may include an automatic speech recognition (ASR) module 1121, a natural language understanding (NLU) module 1123, a planner module 1125, a natural language generator (NLG) module 1127, and/or a text to speech module (TTS) module 1129.

According to an embodiment, the ASR module 1121 may convert the voice input received from the user terminal 1001 into text data. According to an embodiment, the NLU module 1123 may grasp the intent of the user, using the text data of the voice input. For example, the NLU module 1123 may grasp the intent of the user by performing syntactic analysis or semantic analysis. According to an embodiment, the NLU module 1123 may grasp the meaning of words extracted from the voice input by using linguistic features (e.g., syntactic elements) such as morphemes or phrases and may determine the intent of the user by matching the grasped meaning of the words to the intent.

According to an embodiment, the planner module 1125 may generate the plan by using a parameter and the intent that is determined by the NLU module 1123. According to an embodiment, the planner module 1125 may determine a plurality of domains necessary to perform a task, based on the determined intent. The planner module 1125 may determine a plurality of actions included in each of the plurality of domains determined based on the intent. According to an embodiment, the planner module 1125 may determine the parameter necessary to perform the determined plurality of actions or a result value output by the execution of the plurality of actions. The parameter and the result value may be defined as a concept of a specified form (or class). As such, the plan may include the plurality of actions and/or a plurality of concepts, which are determined by the intent of the user. The planner module 1125 may determine the relationship between the plurality of actions and the plurality of concepts stepwise (or hierarchically). For example, the planner module 1125 may determine the execution sequence of the plurality of actions, which are determined based on the user's intent, based on the plurality of concepts. In other words, the planner module 1125 may determine an execution sequence of the plurality of actions, based on the parameters necessary to perform the plurality of actions and the result output by the execution of the plurality of actions. Accordingly, the planner module 1125 may generate a plan including information (e.g., ontology) about the relationship between the plurality of actions and the plurality of concepts. The planner module 1125 may generate the plan, using information stored in the capsule DB 1130 storing a set of relationships between concepts and actions.

According to an embodiment, the NLG module 1127 may change specified information into information in a text form. The information changed to the text form may be in the form of a natural language speech. The TTS module 1129 according to an embodiment may change information in the text form to information in a voice form.

According to an embodiment, all or part of the functions of the natural language platform 1120 may be also implemented in the user terminal 1001.

The capsule DB 1130 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 1130 may store the plurality of capsules in a form of a concept action network (CAN). According to an embodiment, the plurality of capsules may be stored in the function registry included in the capsule DB 1130.

The capsule DB 1130 may include a strategy registry that stores strategy information necessary to determine a plan corresponding to a voice input. When there are a plurality of plans corresponding to the voice input, the strategy information may include reference information for determining one plan. According to an embodiment, the capsule DB 1130 may include a follow-up registry that stores information of the follow-up action for suggesting a follow-up action to the user in a specified context. For example, the follow-up action may include a follow-up utterance. According to an embodiment, the capsule DB 1130 may include a layout registry storing layout information of information output via the user terminal 1001. According to an embodiment, the capsule DB 1130 may include a vocabulary registry storing vocabulary information included in capsule information. According to an embodiment, the capsule DB 1130 may include a dialog registry storing information about dialog (or interaction) with the user. The capsule DB 1130 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set. The capsule DB 1130 according to an embodiment may be also implemented in the user terminal 1001.

According to an embodiment, the execution engine 1140 may calculate a result by using the generated plan. The end user interface 1150 may transmit the calculated result to the user terminal 1001. Accordingly, the user terminal 1001 may receive the result and may provide the user with the received result. According to an embodiment, the management platform 1160 may manage information used by the intelligence server 1100. According to an embodiment, the big data platform 1170 may collect data of the user. According to an embodiment, the analytic platform 1180 may manage quality of service (QoS) of the intelligence server 1100. For example, the analytic platform 1180 may manage the component and processing speed (or efficiency) of the intelligence server 1100.

According to an embodiment, the service server 1200 may provide the user terminal 1001 with a specified service (e.g., ordering food or booking a hotel). According to an embodiment, the service server 1200 may be a server operated by the third party. According to an embodiment, the service server 1200 may provide the intelligence server 1100 with information for generating a plan corresponding to the received voice input. The provided information may be stored in the capsule DB 1130. Furthermore, the service server 1200 may provide the intelligence server 1100 with result information according to the plan. The service server 1200 may include CP service A 1201, CP service B 1202, and CP service C 1203.

In the above-described integrated intelligence system, the user terminal 1001 may provide the user with various intelligent services in response to a user input. The user input may include, for example, an input through a physical button, a touch input, or a voice input.

According to an embodiment, the user terminal 1001 may provide a speech recognition service via an intelligence app (or a speech recognition app) stored therein. In this case, for example, the user terminal 1001 may recognize a user utterance or a voice input, which is received via the microphone, and may provide the user with a service corresponding to the recognized voice input.

According to an embodiment, the user terminal 1001 may perform a specified action, based on the received voice input, independently, or together with the intelligence server 1100 and/or the service server 1200. For example, the user terminal 1001 may launch an app corresponding to the received voice input and may perform the specified action via the executed app.

According to an embodiment, when providing a service together with the intelligence server 1100 and/or the service server 1200, the user terminal 1001 may detect a user utterance by using the microphone 1070 and may generate a signal (or voice data) corresponding to the detected user utterance. The user terminal may transmit the voice data to the intelligence server 1100 by using the communication interface 1090.

According to an embodiment, the intelligence server 1100 may generate a plan for performing a task corresponding to the voice input or the result of performing an action depending on the plan, as a response to the voice input received from the user terminal 1001. For example, the plan may include a plurality of actions for performing the task corresponding to the voice input of the user and/or a plurality of concepts associated with the plurality of actions. The concept may define a parameter to be input upon executing the plurality of actions or a result value output by the execution of the plurality of actions. The plan may include relationship information between the plurality of actions and/or the plurality of concepts.

According to an embodiment, the user terminal 1001 may receive the response by using the communication interface 1090. The user terminal 1001 may output the voice signal generated in the user terminal 1001 to the outside by using the speaker 1055 or may output an image generated in the user terminal 1001 to the outside by using the display 1060.

Referring to FIG. 10, it is described that speech recognition of a voice input received from the user terminal 1001, understanding and generating a natural language, and calculating a result by using a plan are performed on the intelligence server 1100. However, various embodiments of the disclosure are not limited thereto. For example, at least part of configurations (e.g., the natural language platform 1120, the execution engine 1140, and the capsule DB 1130) of the intelligence server 1100 may be embedded in the user terminal 1001 (or the electronic device 101 of FIG. 1), and the operation thereof may be performed by the user terminal 1001.

Figure 11:
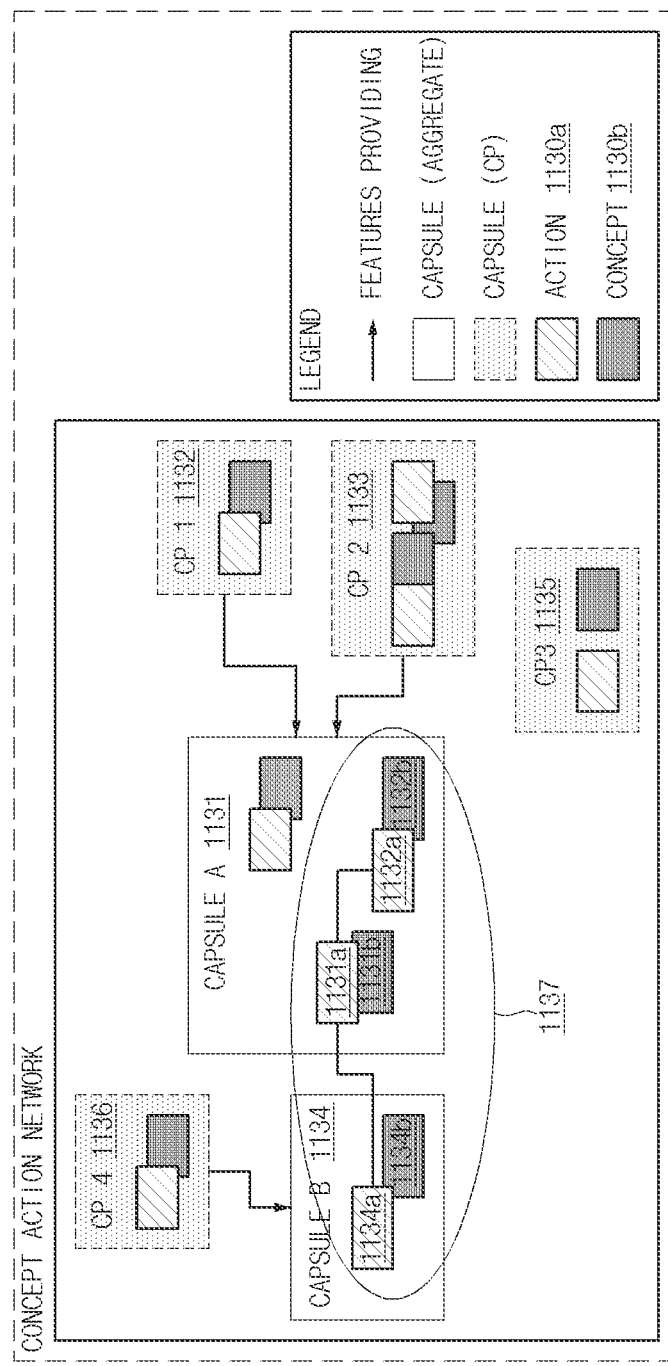
FIG. 11 is a diagram illustrating the form in which relationship information between a concept and an action is stored in a database, according to an embodiment of the disclosure.

FIG. 11 is a diagram illustrating a form in which relationship information between a concept and an action is stored in a database, according to an embodiment of the disclosure.

Referring to FIG. 11, a capsule database (e.g., the capsule DB 1130) of the intelligence server 1100 may store a capsule in the form of a CAN. The capsule DB may store an action for processing a task corresponding to a user's voice input and a parameter necessary for the action, in the CAN form.

The capsule DB may store a plurality capsules (a capsule A 1131 and a capsule B 1134) respectively corresponding to a plurality of domains (e.g., applications). According to an embodiment, a single capsule (e.g., the capsule A 1131) may correspond to a single domain (e.g., a location (geo) or an application). Furthermore, at least one service provider (e.g., CP 1 1132 or CP 2 1133) for performing a function for a domain associated with the capsule may correspond to one capsule. According to another embodiment, the single capsule may include at least one or more actions 1130a and at least one or more concepts 1130b for performing a specified function.

The natural language platform 1120 may generate a plan for performing a task corresponding to the received voice input, using the capsule stored in a capsule database. For example, the planner module 1025 of the natural language platform may generate the plan by using the capsule stored in the capsule database. For example, a plan 1137 may be generated by using actions 1131a and 1132a and concepts 1131b and 1132b of the capsule A 1130a and an action 1134a and a concept 1134b of the capsule B 1134.

Figure 12:
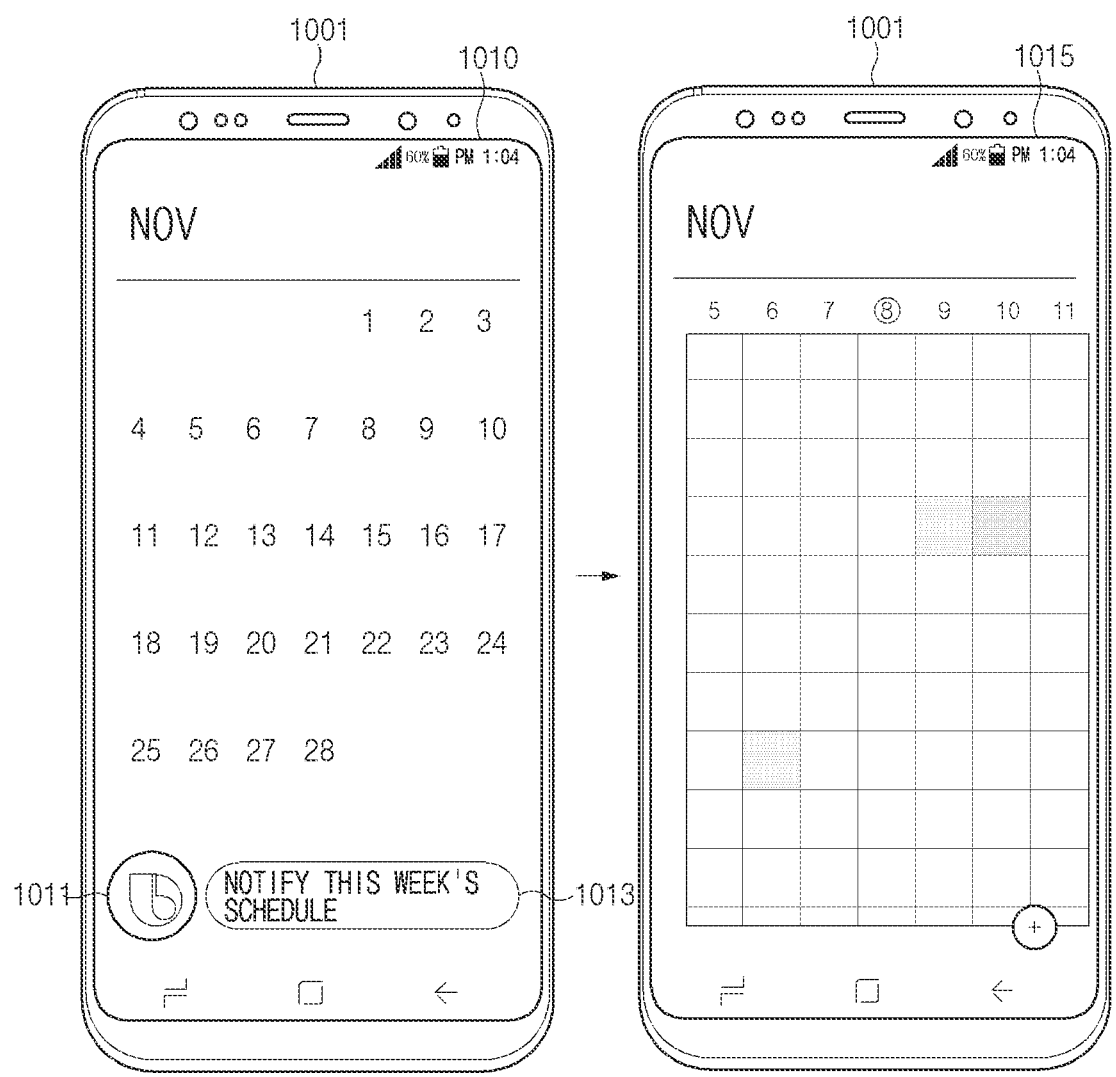
FIG. 12 is a view illustrating a user terminal displaying a screen of processing a voice input received through an intelligence app, according to an embodiment of the disclosure.

FIG. 12 is a view illustrating a screen in which a user terminal processes a voice input received through an intelligence app, according to an embodiment of the disclosure.

Referring to FIG. 12, the user terminal 1001 may execute an intelligence app to process a user input through the intelligence server 1100.

According to an embodiment, on screen 1010, when recognizing a specified voice input (e.g., wake up!) or receiving an input via a hardware key (e.g., a dedicated hardware key), the user terminal 1001 may launch an intelligence app for processing a voice input. For example, the user terminal 1001 may launch the intelligence app in a state where a schedule app is executed. According to another embodiment, the user terminal 1001 may display an object (e.g., an icon) 1011 corresponding to the intelligence app, on the display 1060. According to an embodiment, the user terminal 1001 may receive a voice input by a user utterance. For example, the user terminal 1001 may receive a voice input saying that "let me know the schedule of this week!". According to an embodiment, the user terminal 1001 may display a user interface (UI) 1013 (e.g., an input window) of the intelligence app, in which text data of the received voice input is displayed, on a display.

According to an embodiment, on screen 1015, the user terminal 1001 may display a result corresponding to the received voice input, on the display. For example, the user terminal 1001 may receive a plan corresponding to the received user input and may display 'the schedule of this week' on the display depending on the plan.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   an input device;
   at least one processor; and
   a memory configured to store instructions,
   wherein the instructions, when executed by the at least one processor, cause the electronic device to:
   obtain a natural language input by using the input device,
   convert the natural language input into first input data,
   identify data corresponding to at least part of the natural language input in a specified type of data included in the memory,
   generate second input data based on the identified data, and
   determine at least one task according to the natural language input based on the first input data and the second input data,
   wherein the at least part of the natural language input is a specified word among words included in a sentence according to the natural language input, and
   wherein the specified word includes at least one of a word of a specified type or a word at a specified location among the words included in the sentence.

2. The electronic device of claim 1,
   wherein the first input data is embedding data in units of sentence, and
   wherein the second input data is a data indicating whether the specified word is identified.

3. The electronic device of claim 1,
   wherein the first input data includes embedding data of each of a plurality of tokens, and
   wherein the second input data includes data indicating whether the specified word is identified, and data for a location of the specified word in the sentence.

4. The electronic device of claim 3, wherein the instructions, when executed by the at least one processor, further cause the electronic device to:
   identify a location, at which the second input data is combined with the first input data, based on the data for the location,
   combine the second input data with embedding data of a token of the identified location among a plurality of tokens, and
   determine the at least one task based on the embedding data combined with the second input data.

5. The electronic device of claim 1, wherein the instructions, when executed by the at least one processor, further cause the electronic device to:
   identify a word within a specified semantic similarity range from a specified word among words included in the sentence according to the natural language input, and
   generate the second input data based on the word within the specified semantic similarity range.

6. The electronic device of claim 1, wherein the specified type of the data is data for at least one of a contact, a file name, or an application name.

7. The electronic device of claim 6,
   wherein the at least part of the natural language input is a specified word among words included in a sentence according to the natural language input, and
   wherein the instructions, when executed by the at least one processor, further cause the electronic device to:
   identify that the specified word is found in data of two or more types of the data,
   determine one type among the two or more types based on a priority of each of the two or more types, and
   generate the second input data based on the determined one type.

8. The electronic device of claim 6,
   wherein the at least part of the natural language input is a specified word among words included in a sentence according to the natural language input, and
   wherein the instructions, when executed by the at least one processor, further cause the electronic device to:

identify that the specified word corresponds to two or more types of the data,
output a user interface for making a request for selecting one type of the two or more types,
obtain an input for selecting the one type, and
generate the second input data based on one type determined based on the input.

9. The electronic device of claim 6,
wherein the at least part of the natural language input is a specified word among words included in a sentence according to the natural language input, and
wherein the second input data indicates a type, in which the specified word is identified, from at least one of the contact, the file name, or the application name.

10. An operating method of an electronic device, the operating method comprising:
obtaining a natural language input by using an input device of the electronic device;
converting the natural language input into first input data;
identifying data corresponding to at least part of the natural language input in a specified type of data included in a memory of the electronic device;
generating second input data based on the identified data; and
determining at least one task according to the natural language input based on the first input data and the second input data,
wherein the at least part of the natural language input is a specified word among words included in a sentence according to the natural language input, and
wherein the specified word includes at least one of a word of a specified type or a word at a specified location among the words included in the sentence.

11. The method of claim 10,
wherein the first input data is embedding data in units of sentence, and
wherein the second input data is a data indicating whether the specified word is identified.

12. The method of claim 10,
wherein the first input data includes embedding data of each of a plurality of tokens, and
wherein the second input data includes data indicating whether the specified word is identified, and data for a location of the specified word in the sentence.

13. The method of claim 12, wherein the determining of the at least one task includes:
identifying a location, at which the second input data is combined with the first input data, based on the data for the location;
combining the second input data with embedding data of a token of the identified location among a plurality of tokens; and
determining the at least one task based on the embedding data combined with the second input data.

14. The method of claim 10, wherein the generating of the second input data includes:
identifying a word within a specified semantic similarity range from a specified word among words included in the sentence according to the natural language input; and
generating the second input data based on the word within the specified semantic similarity range.

15. The method of claim 10, wherein the specified type of the data is data for at least one of a contact, a file name, or an application name.

16. The method of claim 15,
wherein the at least part of the natural language input is a specified word among words included in a sentence according to the natural language input, and
wherein the generating of the second input data includes:
identifying that the specified word is found in data of two or more types of the data;
determining one type among the two or more types based on a priority of each of the two or more types; and
generating the second input data based on the determined one type.

17. The method of claim 15,
wherein the at least part of the natural language input is a specified word among words included in a sentence according to the natural language input, and
wherein the generating of the second input data includes:
identifying that the specified word corresponds to two or more types of the data;
outputting a user interface for making a request for selecting one type of the two or more types;
obtaining an input for selecting the one type; and
generating the second input data based on one type determined based on the input.

18. The method of claim 15,
wherein the at least part of the natural language input is a specified word among words included in a sentence according to the natural language input, and
wherein the second input data indicates a type, in which the specified word is identified, from at least one of the contact, the file name, or the application name.

* * * * *